(12) United States Patent
Hentz et al.

(10) Patent No.: US 10,670,507 B2
(45) Date of Patent: *Jun. 2, 2020

(54) ELECTROMECHANICAL DETECTION DEVICE, PARTICULARLY FOR GRAVIMETRIC DETECTION, AND METHOD FOR MANUFACTURING THE DEVICE

(71) Applicant: Commissariat à l'énergie atomique et aux énergies alternatives, Paris (FR)

(72) Inventors: Sébastien Hentz, Varces Allieres et Risset (FR); Thomas Ernst, Morette (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 616 days.

This patent is subject to a terminal disclaimer.

(21) Appl. No.: 14/519,353

(22) Filed: Oct. 21, 2014

(65) Prior Publication Data
US 2015/0107336 A1 Apr. 23, 2015

(30) Foreign Application Priority Data
Oct. 22, 2013 (FR) ...................... 13 60281

(51) Int. Cl.
*G01N 15/10* (2006.01)
*G01N 29/02* (2006.01)
(Continued)

(52) U.S. Cl.
CPC ............... *G01N 15/10* (2013.01); *G01L 1/18* (2013.01); *G01N 29/022* (2013.01); *G01L 1/148* (2013.01);
(Continued)

(58) Field of Classification Search
CPC ......... G01L 1/148; G01L 1/18; G01L 1/2293; G01N 15/10; G01N 2015/1043;
(Continued)

(56) References Cited

U.S. PATENT DOCUMENTS 5,162,691 A * 11/1992 Mariani ................ H03H 9/172
310/321
6,909,824 B1 6/2005 Messica
(Continued)

FOREIGN PATENT DOCUMENTS

FR 2 961 016 A1 12/2011
WO 2012/034949 A1 3/2012
(Continued)

OTHER PUBLICATIONS

European Search Report issued in Application No. EP 14 18 9689 dated Nov. 27, 2014.
(Continued)

*Primary Examiner* — Peter J Macchiarolo
*Assistant Examiner* — Nathaniel Kolb
(74) *Attorney, Agent, or Firm* — Pearne & Gordon LLP

(57) ABSTRACT

Electromechanical detection device, particularly for gravimetric detection, and method for manufacturing the device. The electromechanical detection device includes a support including a face defining a plane, at least one beam that can move relative to the support, and means of detecting beam displacement, outputting a signal that depends on the displacement. The beam is anchored to the support through an end and is approximately perpendicular to the plane, and the other end of the beam includes at least one reception zone that can receive one or several particles causing or modifying displacement of the beam, in order to determine at least one physical property of the particle(s) from the signal.

(Continued)

According to the invention, the detection means are located between the reception zone and the support.

20 Claims, 16 Drawing Sheets

(51) Int. Cl.
*G01L 1/18* (2006.01)
*G01N 5/02* (2006.01)
*G01L 1/22* (2006.01)
*G01L 1/14* (2006.01)

(52) U.S. Cl.
CPC ............. *G01L 1/2293* (2013.01); *G01N 5/02* (2013.01); *G01N 2015/1043* (2013.01); *G01N 2291/0256* (2013.01); *G01N 2291/02466* (2013.01)

(58) Field of Classification Search
CPC . G01N 2291/02466; G01N 2291/0256; G01N 29/022; G01N 29/036; G01N 5/02
USPC .................. 73/24.01, 24.03, 24.06
See application file for complete search history.

(56) References Cited

U.S. PATENT DOCUMENTS

| | | | |
|---|---|---|---|
| 8,524,501 B2* | 9/2013 | Adams | G01N 33/54373 436/22 |
| 2004/0124951 A1* | 7/2004 | Nakamura | H01P 1/127 333/186 |
| 2006/0086174 A1* | 4/2006 | Korpi | G01N 29/036 73/24.01 |
| 2006/0196270 A1* | 9/2006 | Ino | G01P 1/023 73/514.16 |
| 2006/0222292 A1 | 10/2006 | Spoonhower | |
| 2006/0257286 A1* | 11/2006 | Adams | G01N 33/54373 422/82.01 |
| 2010/0041091 A1 | 2/2010 | Axelrod | |
| 2012/0055257 A1* | 3/2012 | Shaw-Klein | H01L 41/081 73/780 |
| 2013/0154440 A1 | 6/2013 | Hentz | |
| 2013/0160550 A1 | 6/2013 | Hentz | |
| 2013/0203248 A1 | 8/2013 | Ernst | |
| 2013/0214644 A1 | 8/2013 | Hentz | |
| 2014/0250980 A1 | 9/2014 | Hentz | |
| 2015/0107357 A1* | 4/2015 | Hentz | G01D 5/266 73/382 G |

FOREIGN PATENT DOCUMENTS

| | | |
|---|---|---|
| WO | 2012/034951 A1 | 3/2012 |
| WO | 2012/034990 A1 | 3/2012 |

OTHER PUBLICATIONS

J. Chaste et al.,"A nonomechanical mass sensor with yoctogram resolution" Nature Nanotechnology, Apr. 1, 2012.
S. Dohn et al., "Mass and position determination of attached particles on cantilever based mass sensors" Review of Scientific Instruments, vol. 78, 2007.
K.L. Ekinci et al., "Ultimate limits to inertial mass sensing based upon nanoelectromechanical systems" Journal of Applied Physics, vol. 95, No. 5, Mar. 1, 2004.
Search Report issued in French Patent Application No. FR 13 60281 dated Jul. 8, 2014.
S. Guillon et al, "Biological functionalization of massively parallel arrays of nanocantilevers using microcontact printing" Sensors and Actuators B: Chemical, vol. 161, 2012.
P Ivaldi et al., "50nm think AlN film-based piezoelectric cantilevers for gravimetric detection" Journal of Micromechanics and Microengineering, vol. 21, 2011.
Lasse J. Kauppinen et al., "Micromechanically tuned ring resonator in silicon on insulator" Optics Letters, vol. 36, No. 7, Apr. 1, 2011.
J. Kehrbusch et al., "Columnar shaped microresonators for mass detection and gas analysis" Microelectronic Engineering, vol. 87, No. 5-8, Nov. 23, 2009.
J. Kehrbusch et al., "High frequency columnar silicon microresonators for mass detection" Applied Physics Letters, vol. 93, No. 2, Jul. 14, 2008.
Mo Li et al., "Ultra-senstivie NEMS-based cantilevers for sensing, scanned probe and very high-frequency application" Nature Nanotechnology, 2007.
E. Mile et al., "In-plane nanoelectromechanical resonators based on silicon nanowire piezoresistive detection" Nanotechnology, vol. 21, 2010.
A.K. Naik et al., "Towards single-molecule nanomechanical mass spectrometry" Nature Nanotechnology, Jun. 21, 2009.
R. Rekha et al., "Design of MOEM Vibration Sensor Using Optical MicroRing Resonator and MicroCantilever Beam" Tencon, 2011.
Valeria Toffoli et al., "Actuation of silicon pillar micro-mechanical resonators by Kelvin polarization force" Microelectronic Engineering, vol. 111, May 30, 2013.
U.S. Appl. No. 14/519,390, filed Oct. 21, 2014.

* cited by examiner

ELECTROMECHANICAL DETECTION DEVICE, PARTICULARLY FOR GRAVIMETRIC DETECTION, AND METHOD FOR MANUFACTURING THE DEVICE

TECHNICAL FIELD

This invention relates to an electromechanical detection device and a method for manufacturing this device.

This device may be a resonant device, in which case it usually comprises a beam forming a resonator, or a non-resonating device.

The invention is particularly applicable to gravimetric detection and more particularly to chemical sensors for the detection of gas, biological sensors in a liquid medium for detection of biological cells, and MEMS (Micro-Electro-Mechanical Systems) and/or NEMS (Nano-Electro-Mechanical Systems)-based mass spectrometry (MEMS-MS and NEMS-MS).

The invention is also applicable to detection of force, stress or strain.

STATE OF PRIOR ART

Resonant devices with in plane-actuation are already known. All these devices include beams that are parallel to the substrates of these devices. Refer to the following documents:

WO 2012/034949, invention by S. Hentz
WO 2012/034951, invention by S. Hentz et al.
WO 2012/034990, invention by S. Hentz.

We will now briefly summarise the principle of resonant mass detection.

Consider a particle or a set of particles with a total mass $m_p$, that is placed on the surface of a resonator with stiffness k and effective mass m. The resonant frequency of the resonator then becomes equal to $$f = \frac{1}{2\pi}\sqrt{\frac{k}{m+m_p}}.$$

Therefore frequency response peaks (in open loop) before and after deposition of the mass $m_p$, are offset by a quantity $\Delta f$ that is not very different from $$-\frac{m_p}{2m} \cdot \frac{1}{2\pi}\sqrt{\frac{k}{m}}.$$

Therefore when the resonator is used in a closed loop, its resonant frequency can be monitored in real time by means of electrical transduction means and loop closing means.

It is observed that adsorption of an individual particle or a group of particles of an analyte on the resonator surface suddenly reduces the resonant frequency of the resonator. The mass of the particle or the group of particles can be deduced from this frequency skip measurement $\Delta f$.

The detection principle that has just been summarised is perfectly generic and various devices are known for putting it into application, particularly surface acoustic wave resonators, bulk acoustic wave resonators, quartz crystal microbalances and MEMS (Micro-Electro-Mechanical System) beams.

But the resonant device may advantageously be a NEMS because the expression for the frequency skip $\Delta f$ given above shows that the sensitivity of the frequency to added mass increases as the total resonator mass reduces. Therefore resonant devices with nanometric dimensions have an advantage in terms of sensitivity, but also in terms of detection limit. Thus, with NEMS systems, it has been possible to measure masses $10^{12}$ times smaller than have been measured with quartz crystal microbalances. Refer to the following document for further information on this subject:

K. L. Ekinci, Y. T. Tang and M. L. Roukes, 2004, "Ultimate limits to inertial mass sensing based upon nanoelectromechanical systems", *Journal of Applied Physics* 95 (5): 2682. doi:10.1063/1.1642738.

Similarly, a mass of the order of 1 yg ($10^{-27}$ kg) was recently measured. Refer to the following document for further information on this subject:

J. Chaste, A. Eichler, J. Moser, G. Ceballos, R. Rurali and A. Bachtold, 2012, "A nanomechanical mass sensor with yoctogram resolution", *Nature Nanotechnology* 7: 301-304. doi:10.1038/nnano.2012.42.

There are very many applications of mass resonant detection. For example, there are (1) chemical sensors for gas detection, (2) biological sensors in a liquid medium for detection of biological cells and (3) NEMS-based mass spectrometry (NEMS-MS). For these applications, the detection limit (the smallest detectable mass) is obviously of overriding importance, not only to more precisely determine the quantity of material measured, but also to detect species that are very finely dispersed or diluted in a large volume of a carrier element.

(1) In the case of chemical sensors for gas detection, a NEMS is used for which the surface can be covered by a functionalisation layer with a particular chemical affinity towards some species to be measured. Particles corresponding to these species are absorbed in this layer, or homogeneously over the entire surface of the NEMS.

When the concentration to be measured becomes very low, the probability of species being captured by the extremely small area of the NEMS becomes very low. Collectively addressed arrays can then be used in order to benefit from the very good sensitivity of resonators. But a large capture area can also be used. Refer to the following document for further information on this subject:

I. Bargatin, E. B. Myers, J. S. Aldridge, C. Marcoux, P. Brianceau, L. Duraffourg, E. Colinet, S. Hentz, P. Andreucci, and M. L. Roukes, 2012, "Large-scale integration of nano-electromechanical systems for gas sensing applications", *Nano letters* 12 (3) (14 mars): 1269-74. doi:10.1021/nl2037479 and more particularly to FIG. 1 in this document.

(2) In the case of biological sensors in a liquid medium, the problem is the same as for chemical sensors but is even more severe: in this case the resonant device is placed in the liquid medium in which biological particles have to be detected; they may then be detected individually, because their concentration can become very low. Similarly, resonator arrays may be used with or without individually addressing, and functionalised or not. Refer to the following document for further information on this subject:

S. Guillon, S. Salomon, F. Seichepine, D. Dezest, F. Mathieu, A. Bouchier, L. Mazenq, C. Thibault, C. Vieu, T. Leïchlé and L. Nicu, 2012, "Biological functionalization of massively parallel arrays of nanocantilevers using micro-contact printing", *Sensors and Actuators B: Chemical* 161 (January): 1135-1138. doi:10.1016/j.snb.2011.10.084 and more particularly to FIG. 1 in this document.

(3) In the case of NEMS-MS systems, there is question of measuring the mass of each particle (for example biological) of a mix that is initially in the liquid phase and that is projected onto a NEMS under a vacuum in order to determine the mass spectrum of the content of the mix, for example for biomedical identification applications. Such a system is shown in FIG. 1 in the following document that should be referred to:

A. K. Naik, M. S. Haney, W. K. Hiebert, X. L. Feng and M. L. Roukes, 2009, "Towards single-molecule nanomechanical mass spectrometry", *Nature Nanotechnology* 4: 445-450. doi:10.1038/NNANO.2009.152.

One major problem with this system is the use of a single NEMS to detect particles that are projected on its surface: typically the surface may have an area of 1 µm$^2$ while the particle beam may have a projected area of the order of a few square millimetres to a few square centimetres, depending on the type of injection system.

Once again, the critical aspect of the use of extremely dense NEMS arrays to maximise the capture area can be seen. But there is an additional problem in the case of NEMS-MS that does not occur with the previous two cases; in this case the objective is to measure the mass of a particle which is point like or at least smaller than the area of the resonator, and that is not distributed on this surface. However, the shift in frequency induced by the addition of a particle depends not only on the mass but also on the arrival position of the particle on the resonator. It is then necessary to measure several resonant frequencies in real time, instead of only one. Refer to the following document for further information on this subject:

S. Dohn, W. Svendsen, A. Boisen and O. Hansen, 2007, "Mass and position determination of attached particles on cantilever based mass sensors", *Review of Scientific Instruments* 78: 103303. doi:10.1063/1.2804074.

In each case (1) to (3), the (three-dimensional) elements such as beams or cantilevers used for detection of particles have a dimension (length) at least 10 times as large as the other two (and therefore may be considered to be single-dimensional); and this dimension is in the plane of the substrate on which the device considered is formed.

Furthermore, the transduction means used are (a) either in the same plane as the device, (b) or in a plane parallel to the plane of the device and at a distance from it equal to the thickness of the layers deposited on the device itself.

In case (a), refer to the following document:

E. Mile, G. Jourdan, I. Bargatin, S. Labarthe, C. Marcoux, P. Andreucci, S. Hentz, C. Kharrat, E. Colinet and L. Duraffourg, 2010, "In-plane nanoelectromechanical resonators based on silicon nanowire piezoresistive detection", *Nanotechnology* 21 (16) (23 April): 165504. doi:10.1088/0957-4484/21/16/165504 and particularly FIG. 1 in this document.

In case (b), refer to the following document:

Mo Li, H. X. Tang et M. L. Roukes, 2007, "Ultra-sensitive NEMS-based cantilevers for sensing, scanned probe and very high-frequency applications", *Nature nanotechnology* 2 (2) (February): 114-20. doi:10.1038/nnano.2006.208 and particularly FIG. 1 in this document. The following document is also relevant:

P. Ivaldi, J. Abergel, M. H. Matheny, L. G. Villanueva, R. B. Karabalin, M. L. Roukes, P. Andreucci, S. Hentz et E. Defaÿ, 2011, "50 nm thick AlN film-based piezoelectric cantilevers for gravimetric detection", *Journal of Micromechanics and Microengineering* 21: 085023. doi:10.1088/0960-1317/21/8/085023 and particularly FIG. 3 in this document.

Therefore, connections have to be brought out in the same plane as the device itself.

These characteristics (single-dimensional elements in the plane of the substrate, the need to bring out connections in the plane of the device) make it impossible to obtain good SA/SI ratios, where SA represents the active area, in other words the vibrating surface area of the MEMS or NEMS considered, and SI is the inactive area, in other words the surface area that does not vibrate. Thus, the capture area of elements to be detected is extremely low. For example, it is very difficult to obtain an active surface density greater than 1% with these characteristics.

PRESENTATION OF THE INVENTION

The purpose of this invention is to overcome the above-mentioned disadvantages.

To achieve this, an electromechanical detection device conforming with the invention comprises one or several beams approximately perpendicular to a support that forms part of the device; and each beam is directly or indirectly anchored to the support by one end while its other end comprises a collection zone for particles to be studied.

Specifically, the purpose of this invention is an electromechanical detection device comprising:

a support including a face defining a plane, at least one beam with first and second ends that can move relative to the support, and means of detecting beam displacement, adapted to output a signal that depends on the displacement.

The beam is anchored (directly or indirectly) to the support through the first end and approximately perpendicular to said plane, and the second end of the beam comprises at least one reception zone that can receive one or several particles that can provoke or modify displacement of the beam in order to determine at least one physical property of the particle(s) from the signal output by the displacement detection means.

The device is characterized in that the detection means are located between the reception zone and the support.

According to one particular embodiment of the device, object of the invention, the detection means are anchored to the beam and formal in at least one layer which is parallel to said plane.

According to one preferred embodiment of the invention, the physical property of the particle(s) is the mass. But the invention may also be used for other purposes including detection of a stress, a force, a surface strain when the beam is in a static functional mode (without actuation or with static actuation).

The support may be a homogeneous or heterogeneous substrate, particularly a substrate comprising a stack of layers, for example forming an integrated circuit.

According to a preferred embodiment of the invention, a section of the reception zone in a first plane parallel to said plane is larger than the section of the beam in a second plane that is also parallel to said plane.

The reception zone may have different shapes, particularly the shape of a tray, a dish or an ovoid.

According to one preferred embodiment, the device according to the invention comprises more than one beam, namely a set of beams organised into an array.

Preferably, the second end of the beam is provided with a tray comprising a plane face that is approximately perpendicular to the beam and forms the reception zone.

According to one particular embodiment of the invention, the beam forms a resonator for which the resonant frequency varies when the reception zone receives the particle(s), and the device also comprises means of actuating the beam.

These actuation means may be chosen from among electrostatic actuation means, piezoelectric actuation means, thermoelastic actuation means and optical actuation means.

The beam displacement detection means may be chosen from among piezoresistive strain gauge detection means, capacitive detection means, piezoelectric detection means and optical detection means.

The device according to the invention may be provided with means for processing the signal output from the beam displacement detection means, these signal processing means being designed to determine said physical property.

This invention also relates to a method of manufacturing the device, method according to which the beam(s) is (are) manufactured, preferably in a standalone form or otherwise co-integrated, using a surface technology.

BRIEF DESCRIPTION OF THE DRAWINGS

This invention will be better understood after reading the description of example embodiments given below for information and that are in no way limitative, with reference to the appended drawings in which:

FIG. 9 is a variant of FIG. 8.

DETAILED PRESENTATION OF PARTICULAR EMBODIMENTS

Figure 1:
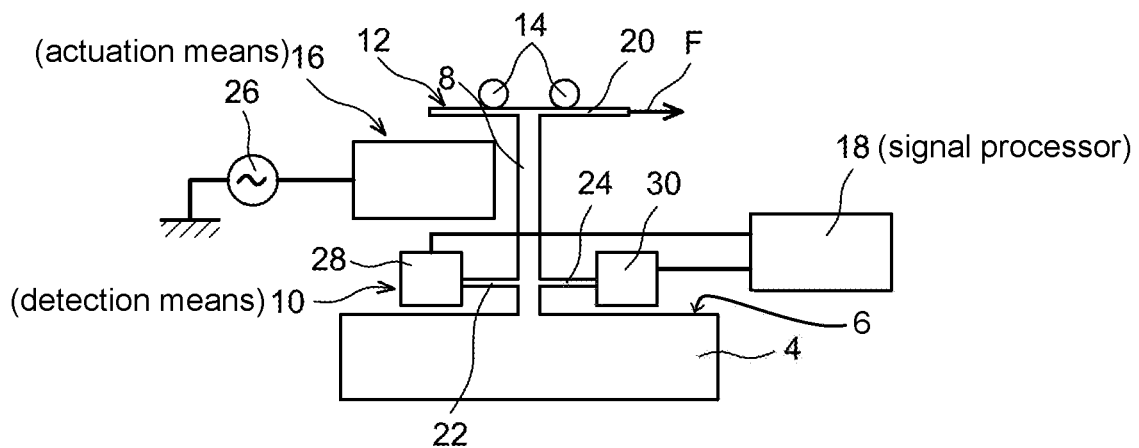
FIG. 1 is a diagrammatic sectional view of a unit device according to the invention.

FIG. 1 is a diagrammatic sectional view of an example of the electromechanical detection device according to the invention. In this example, it is a unit device 2 that comprises:
- a substrate or a support 4, comprising a face that defines a plane 6,
- a beam 8 that can move relative to the substrate 4, and means 10 of detecting displacement of the beam 8 to output a signal that depends on this displacement.

According to the invention, the beam 8 is anchored to the substrate 4 at a first end and is approximately perpendicular to the plane 6. The second end of the beam 8 comprises a reception zone 12 in which one or several particles 14 that modify displacement of the beam can be received. And a physical property of the particle(s) 14 is determined from the signal output by the displacement detection means 10.

It can be seen that the section of the reception zone 12 in a plane parallel to the plane 6 is larger than the section of the beam 8 in a plane parallel to the plane 6.

Note that in the example shown in FIG. 1, the beam 8 forms a resonator for which the resonant frequency varies when the reception zone 12 receives the particle(s) 14. And the device 2 also comprises means 16 of actuating the beam 8.

The device shown in FIG. 1 is also provided with means 18 of processing the signal output by the means 10 of detecting displacement of the beam 8. These signal processing means 18 are designed to determine the physical property mentioned above.

The device is a chemical sensor for gas detection, but this is simply an illustrative example that is in no way limitative. The reception zone that forms part of the beam and that will be discussed in more detail later, is covered with a layer (not shown) that has a chemical affinity towards the gas to be detected. Thus in this case, the physical property is the particular mass of gas atoms or molecules to be detected. Detection of the mass of the particle(s) absorbed by the reception zone can also be used to determine the concentration of the analysed gas, if required.

Admittedly, the reception zone could be composed of the free surface of the second end of the beam 8. However, in the example shown in FIG. 1, the second end of the beam 8 has a tray 20. This tray comprises a plane face that is approximately perpendicular to the beam 8 and forms the reception zone 12. Thus, the gas capture surface is increased. The size of the tray 20 is chosen as a function of the envisaged detection. In FIG. 1, the arrow F shows the direction of displacement of the tray 20.

As can be seen in FIG. 1, the detection means 10 are located between the tray 20 and the substrate 4. The same applies for the actuation means 16.

In fact, a unit device is not used so as to obtain an appropriate capture area: a device according to the invention comprising more than one beam, namely a set of beams organised in an array, is used. This is diagrammatically shown in FIG. 2.

Figure 2:
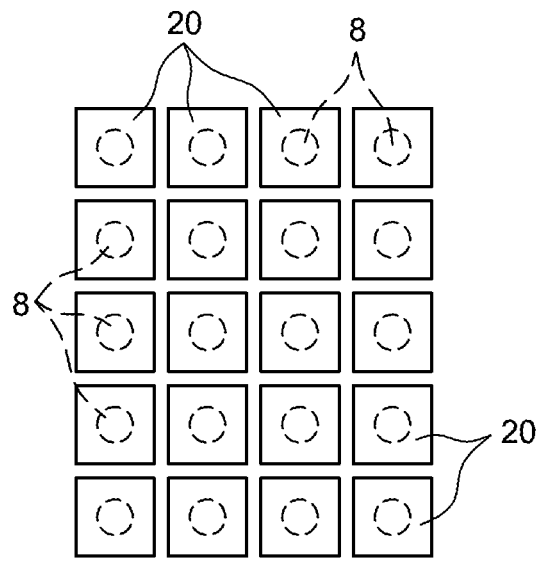
FIG. 2 is a diagrammatic top view of a device according to the invention comprising several unit devices.

This FIG. 2 is a top view of such a device. The array of beams 8 can be seen, each of the beams is provided with a tray 20, perpendicular to the surface of the (not shown) substrate of the device. The array of beams and trays thus formed will provide maximum coverage of the area of the substrate.

The detection means and displacement means (not shown) that are respectively associated with the beams in the array, are also included between the substrate and the corresponding trays 20.

In fact in this particular embodiment, the surface of the substrate has been broken down into elementary capture pixels, with a very good coverage density, and everything that does not participate in the capture area thus formed (particularly the detection means, connections and contacts) has been placed under the pixels considered.

Figure 3:
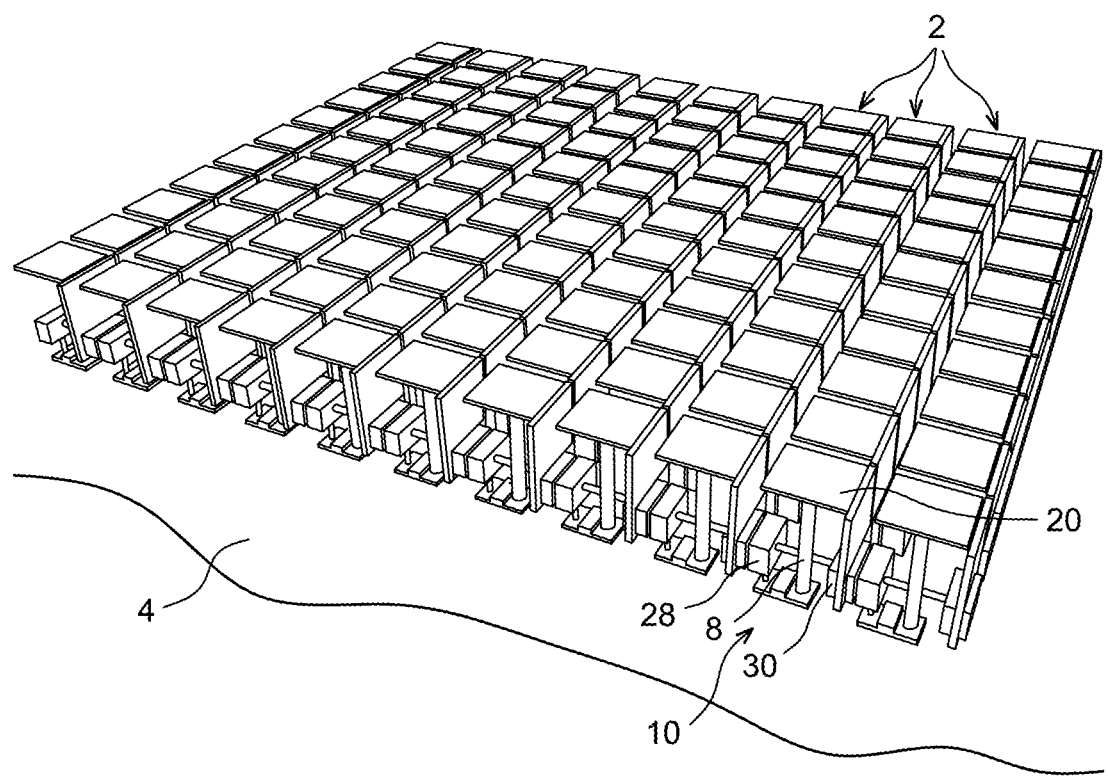
FIG. 3 is a diagrammatic perspective view of an array of unit devices according to the invention.
Figure 4:
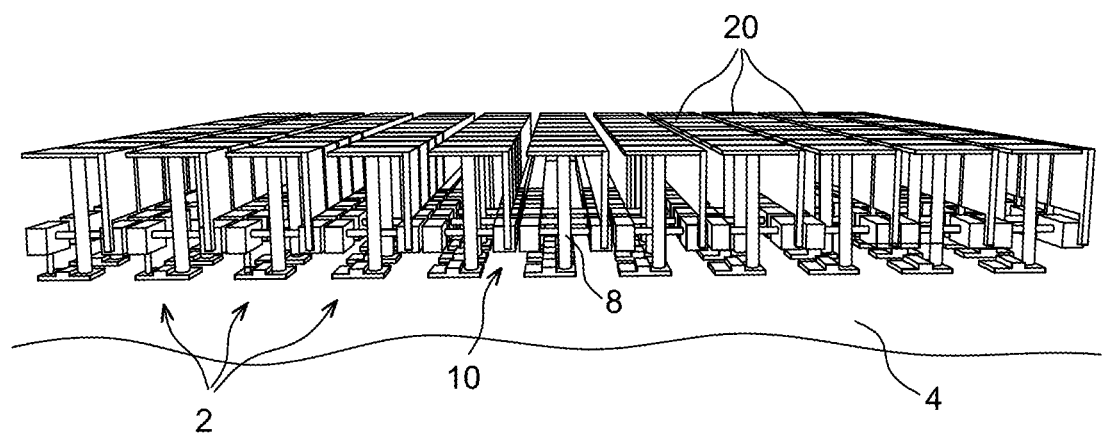
FIG. 4 is another diagrammatic perspective view of this array.

FIGS. 3 and 4 are diagrammatic perspective views of an array of unit devices 2 according to the invention. The figures show beams 8, detection means 10 and trays 20 of each of the unit devices 2. The other references shown in FIG. 3 are described in detail later with reference to FIG. 5.

Note that this figure is a block diagram representing an example of a detection device with its elementary electronic circuit 32, for example comprising CMOS transistors. This circuit 32 makes it possible to address and possibly to amplify the signal output from the detection means. This FIG. 5 does not show the interconnection levels of the circuit 32 that can be made between the transistors and the beams in the device. These interconnection levels are necessary to access the different electrodes of the transistors and the detection and actuation means.

In the examples shown in FIGS. 1 to 4, the actuation means 16 are of the electrostatic type, and the detection means 10 comprise piezoresistive gauges 22 and 24 made of silicon or metal or graphene or carbon nanotubes on each side of the corresponding beam 8. But any type of detection (transduction) can be envisaged, provided that it is achievable in practice.

FIG. 1 also shows an alternating voltage source 26 to carry the electrode forming the actuation means 16.

FIG. 1 also shows the corresponding anchors 28 and 30 of the gauges 22 and 24. These anchors are electrically conducting and are rigidly fixed to the substrate 4 by means not shown. The processing means 18 recover signals output by the detection means 10 through the anchors 28 and 30.

The actuation means may be electrostatic (as we have just seen) or piezoelectric or even thermoelastic or even optical. And the detection means may also be capacitive detection means, or piezoresistive detection means with silicon gauges or metal gauges (as we have seen above) or piezoelectric detection means or even optical detection means. We will consider this matter further in the description of FIGS. 7 to 10.

Conducting lines, for example made of metal, have to be "pulled" to the lower levels of interconnections used by the CMOS technology in order to make the electrical connections to the unit devices. Therefore, it would also be possible to envisage co-integrating these unit devices with more or less elementary CMOS electronic circuits at each pixel, all these circuits being connected to a global electronic read circuit located at the periphery of the array of unit devices. Therefore it could be envisaged that each unit device is partly or entirely made in or above the interconnection levels called the back-end of the CMOS, and is therefore made of metal.

If these devices are made above classical CMOS interconnection levels, we will for example refer to the above-IC sensor technology. If these devices are made in or between interconnection levels, we will for example refer to the co-integrated technology. This means that conventional elements using the CMOS technology are made at the same time as the elements of the sensor, for example in the back-end.

Consider FIG. 5 once again. It diagrammatically shows an example of a unit device using the "above-IC" technology. The array shown in FIGS. 3 and 4 includes many devices of this type.

The figure shows the beam 8 supported on the substrate 4, the tray 20 provided on the beam 8, the piezoresistive gauges 22 and 24 that may for example be made of doped silicon or metallic, in the back-end of the CMOS above the substrate 4, the electrode 16 for the electrostatic actuation also above the substrate 4, and an elementary electronic circuit 32 buried in this substrate 4 and formed by a set of transistors for example of the CMOS type. In the case of gauges above the CMOS 32, said gauges may be transferred using the wafer bonding technique or they may be deposited.

Anchors 28 and 30 can also be seen. These anchors 28 and 30 are connected to the elementary electronic circuit 32 through lower interconnection levels 34. The connections between the various elements are not all visible on the diagrammatic sectional view in FIG. 5. Note also that in this FIG. 5, the electrode 16 is located behind the gauge 24; there is no physical intersection between this electrode 16 and the gauge 24.

Figure 5:
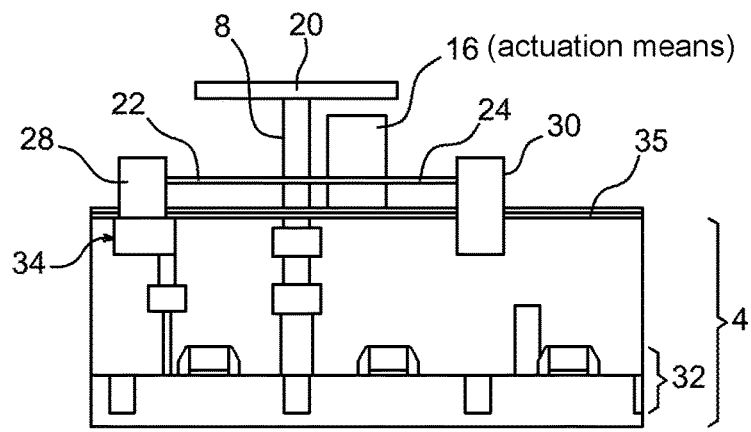
FIG. 5 is a diagrammatic sectional view of another unit device according to the invention.

In FIG. 5, the reference 35 denotes a lower stop layer used for fabrication of the device shown in this figure.

Let us return to the problem of the active surface density. This problem is similar to the problem concerning microbolometers. These microbolometers are sensors that are densely distributed on a surface so as to absorb infrared radiation. However, the concept of the microbolometer is very different from this invention and is more similar to prior art, more particularly to FIG. 1 in the article by Mo Li et al. (already mentioned) and FIG. 3 in article by P. Ivaldi et al. (already mentioned).

In a microbolometer, the transduction means (to read the resistance) and contacts are not below the device, but are above it and in a plane parallel to it. Furthermore, the structures used are membranes and are not single-dimensional.

Figure 6:
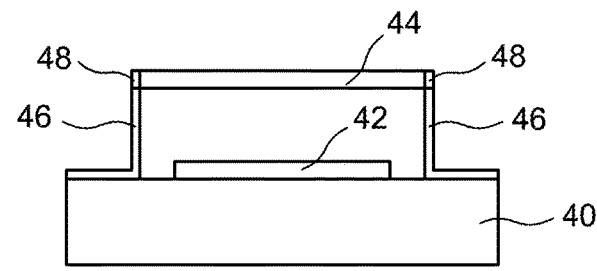
FIG. 6 is a diagrammatic view of a microbolometer.

This is shown in FIG. 6 that shows the principle diagram of a microbolometer. This shows a silicon substrate 40 comprising a read circuit (not shown), a reflector 42 on the substrate, a (two-dimensional) membrane structure 44 that absorbs infrared radiation, at 2 μm from the substrate in the example shown, and electrodes 46 connected to the structure 44 through gold contacts 48.

Figure 7:
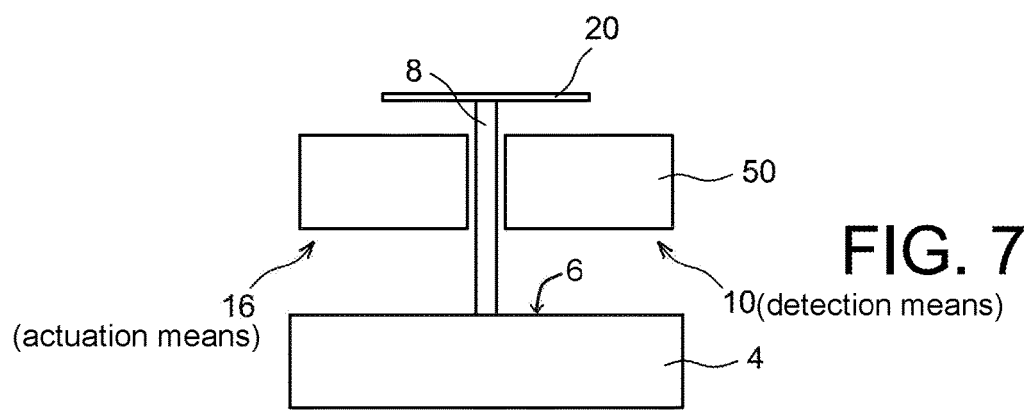
FIG. 7 is a diagrammatic sectional view of a unit device according to the invention using capacitive detection.

FIG. 7 shows a diagrammatic sectional view of a unit device according to the invention in which the detection means 10 are capacitive. The substrate 4, the vertical beam 8, the (horizontal) tray 20, the electrode 16 for electrostatic actuation of the beam 8 and an electrode 50 for capacitive detection of the displacement of the beam 8 are shown. This electrode 50 is connected to means not shown designed to process signals output by the electrode 50 during displacement of the beam 8.

Figure 8:
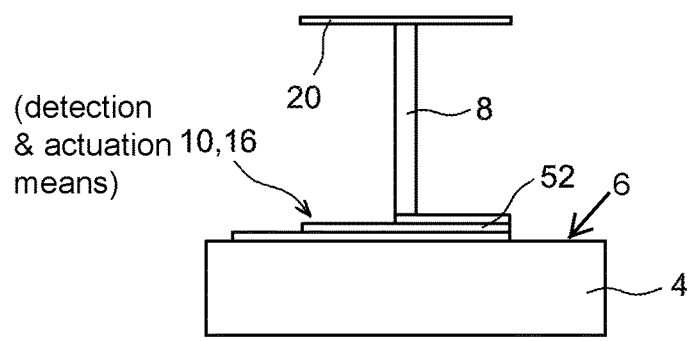
Figure 9:
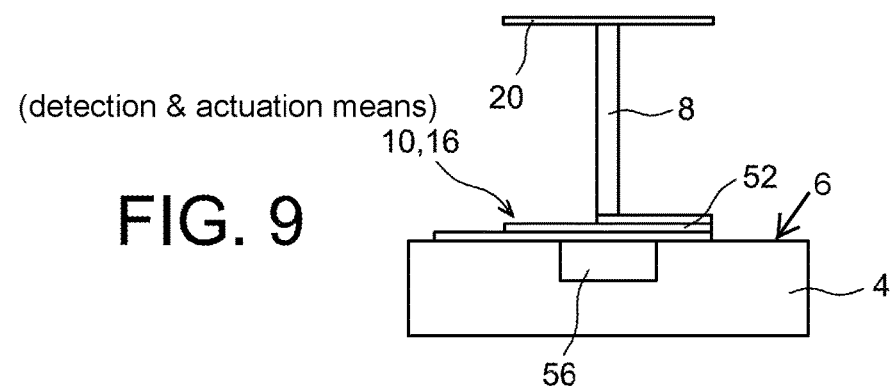
FIG. 9 is a diagrammatic sectional view of a unit device according to the invention using piezoelectric actuation and detection.

FIG. 8 is a diagrammatic sectional view of a unit device according to the invention provided with piezoelectric actuation and detection.

The substrate 4, the beam 8 and the tray 20 can also be seen. In this example, the detection means 10 and the actuation means 16 are composed of a single piezoelectric stack. This stack is conventionally composed of a piezoelectric layer included between two electrically conducting layers.

Care has to be taken with the design of the shape of the piezoelectric stack such that the stress field produced by bending of the device does not cancel out the charges collected between the two electrodes in the stack. For example, as shown in FIG. 8, the stack can be made asymmetric such that the positive stresses on one side of the device are not cancelled out by the negative stresses. The substrate can also be recessed so that the stress in the stack 52 is higher. This is diagrammatically shown in FIG. 9 which shows that a recess 54 is provided in the substrate 4 under the stack 52.

Figure 10:
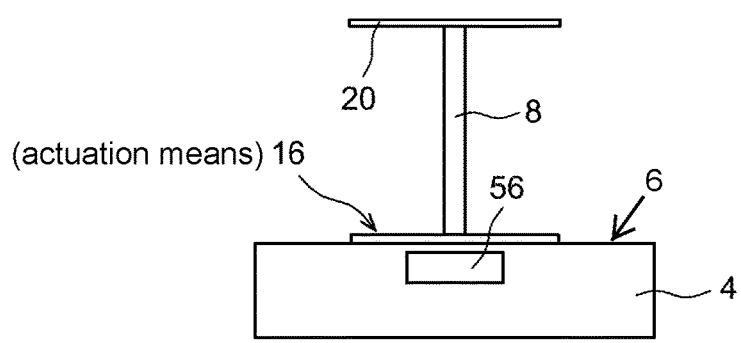
FIG. 10 is a diagrammatic sectional view of a unit device according to the invention, using a thermoelastic actuation, FIGS. 11A to 11K diagrammatically show steps in a stand-alone type method for manufacturing a device according to the invention, FIGS. 12A to 12G diagrammatically show steps in another stand-alone type method for manufacturing a device according to the invention, and FIGS. 13A to 13J diagrammatically show steps in a co-integrated type method for manufacturing a device according to the invention.

FIG. 10 shows a diagrammatic sectional view of a unit device according to the invention provided with thermoelastic actuation means. The detection means are not shown.

The substrate 4, the beam 8 and the tray 20 can also be seen. In this example, the actuation means 16 comprise a metallic layer 56 formed on the substrate 4. The beam 8 is supported on the substrate through the layer 56.

As can be seen, a cavity 58 is provided in the substrate 4 under the layer 56, such that (as for FIG. 9) the stress and/or displacement obtained are maximised.

The metallic layer 56 is heated by passing a current through it, which requires electrical connections (not shown). Differential expansion between the metal and the layer 56 and the material from which the substrate 4 is made causes a bimetallic strip effect and therefore actuation of the device.

In the examples of the invention that have been given so far, the device was resonant. But the invention is not limited to this case; a device according to the invention may also be non-resonant. In this case, detection is said to be in static mode. Such a device can detect a force, for example a cellular force.

This consists of measuring the mechanical force that a cell can apply on its environment or on itself as a function of the conditions of this environment or the chemical species present, in order to understand fundamental mechanisms or for therapeutic purposes.

Refer to the following document on this subject:

US 2010/0041091, Axelrod et al., "Microfluidic embedded polymer NEMS force sensors"

and particularly FIG. 1 in this document.

The objective is to "place" a living cell (that is therefore in a fluid medium) between a support and a NEMS device for which a property, for example the resistance, changes as a function of the force or displacement imposed by the cell on the device.

One of the major problems that arises with this technique before it can be used in practice in an industrial context originates from the difficulty in placing a cell at the required location; a fluid containing the cells is passed on the surface of a NEMS in the hope that a cell will latch on at the right location.

This invention can increase this probability of capture by several orders of magnitude; all that is necessary is for a cell to at least partly cover the trays of two adjacent unit devices according to the invention. The force applied by the cell can be determined using the displacement reading means disclosed above.

An example of a non-resonant unit device according to the invention is identical to the example shown in FIG. 1, except without any actuation means 16 (and the source 26). Displacement of the beam 8 is then provoked by the cell described above.

As we have seen, in this case a non unit device comprising several unit devices is rather used. FIG. 2A shows a top view of such a device.

We will now refer to FIGS. 11A to 11K to describe an example fabrication of a unit device according to the invention. This is a stand-alone type method. It uses a surface technology.

Figure 11A:
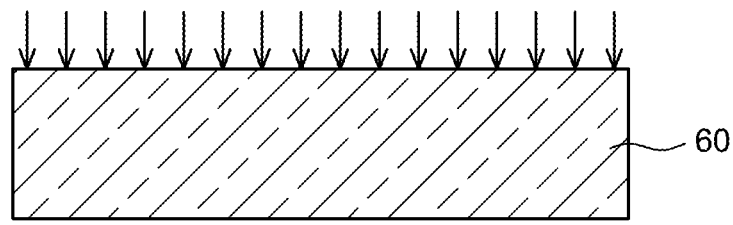

A silicon substrate 60 with full wafer doping is used, for example with a doping concentration of $10^{19}$ atoms per cubic centimetre (FIG. 11A).

Figure 11B:
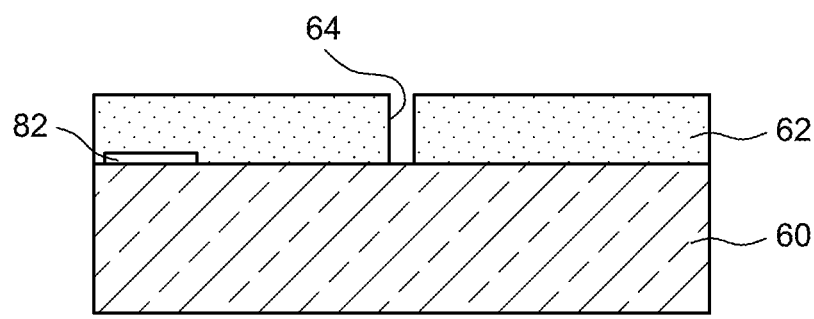

Contacts such as the contact 82 that will be considered in more detail later are formed on the substrate, and a layer 62 of $SiO_2$ is deposited for example with a thickness equal to 1 μm, and lithography is done on this layer to expose the pattern 64 of the NEMS contained in the device (FIG. 11B).

Figure 11C:
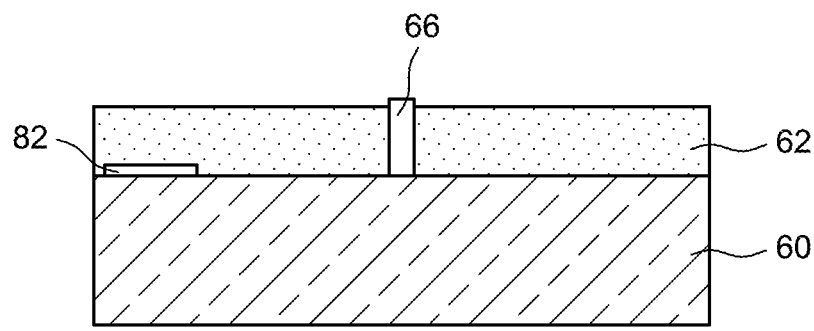

Silicon 64 is deposited selectively relative to $SiO_2$ on the pattern thus obtained by epitaxy, for example over a thickness of 1 μm (FIG. 11C).

Figure 11D:
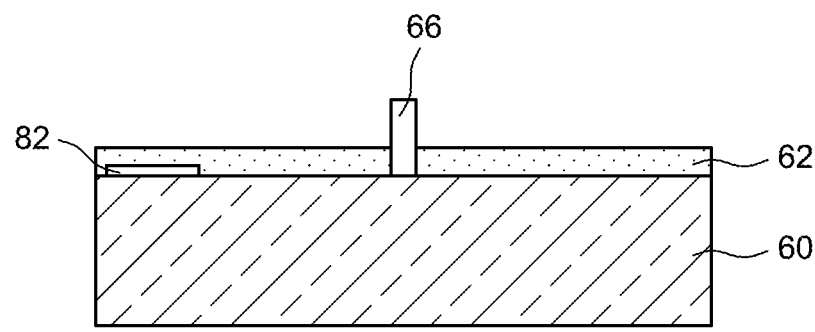

A thickness is eliminated from the layer 62 to expose the deposited silicon 66 corresponding to the beam in the device (FIG. 11D).

Figure 11E:
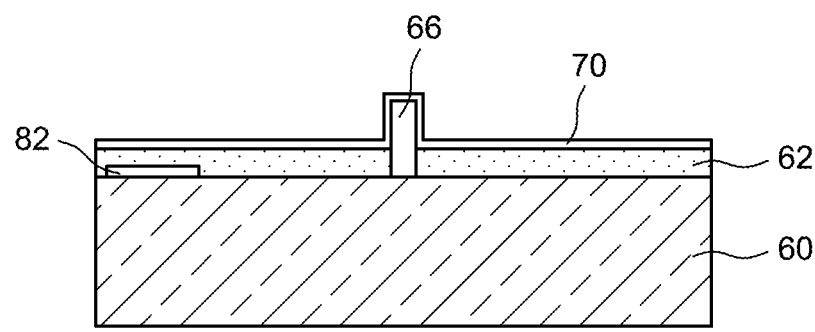

A layer 70 of $SiO_2$ is deposited on the structure thus obtained, for example 200 nm thick (FIG. 11E). Another sacrificial layer could be used instead of such an $SiO_2$ layer, for example made of a slightly dense oxide.

Figure 11F:
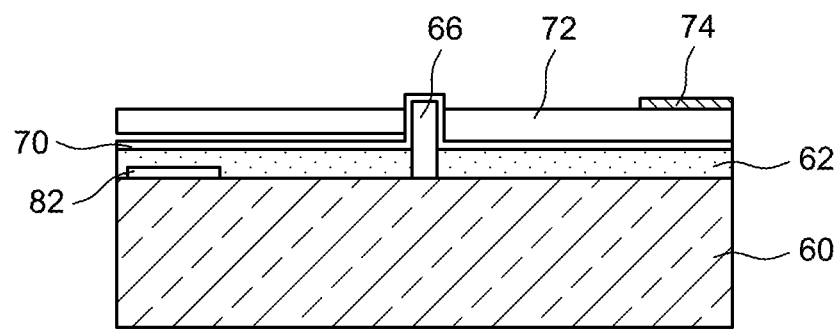

A polysilicon layer 72 is deposited on top of the layer 70 by LPCVD or a conducting material, for example AlSi, is deposited for example with a thickness of 1 μm. A conducting deposit (for example AlSi) is then made to obtain the corresponding contacts 74; and these contacts are formed by lithography and then etching (FIG. 11F).

Figure 11G:
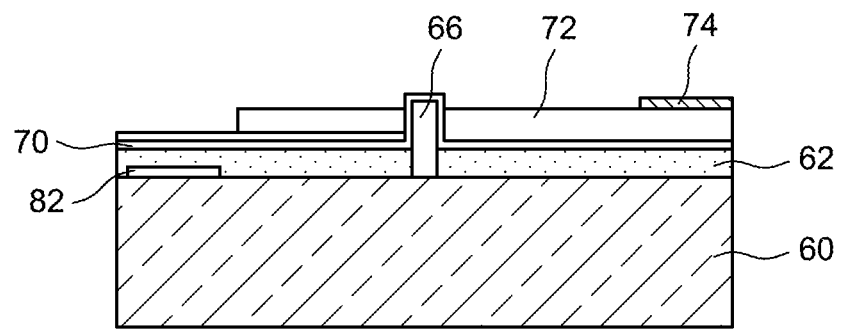

Part of the layer 72 is eliminated by lithography and etching (FIG. 11G).

Figure 11H:
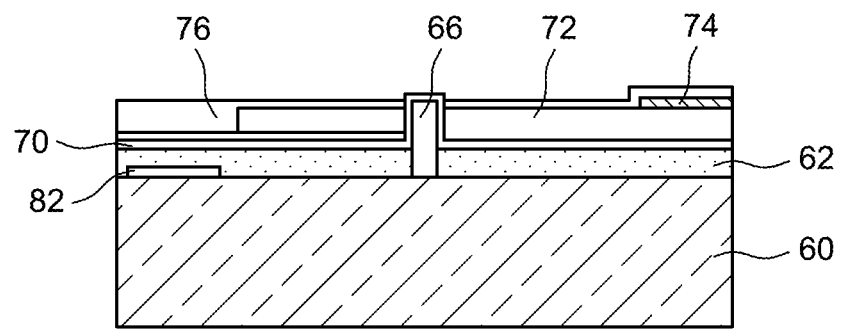

A silica layer 76 is deposited on the structure obtained, for example more than 2 μm of $SiO_2$, and it is then planarised by CMP, in other words using a mechanical chemical polishing method (FIG. 11H).

Figure 11I:
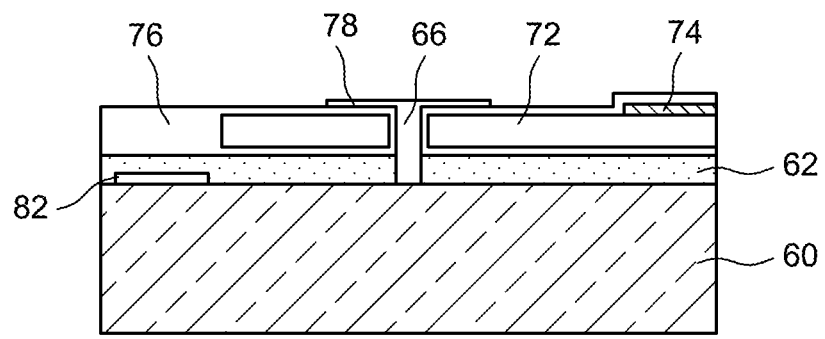

A polysilicon or metal layer is then deposited, for example 20 nm thick, and the tray 78 of the device is then formed by lithography and etching (FIG. 11I).

Figure 11J:
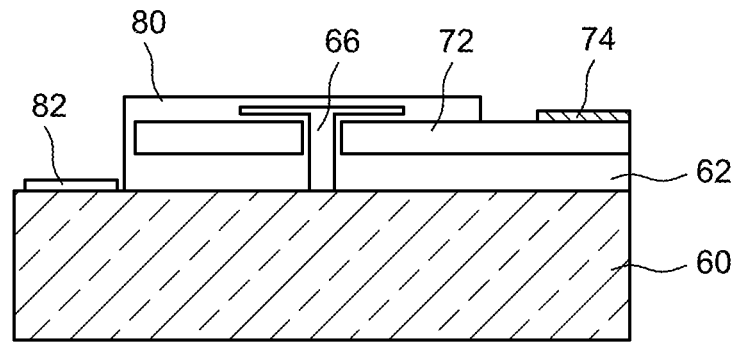

A silica protection layer 80 is then deposited on the structure obtained, this layer 80 is eliminated locally by successive photolithography and etching operations, to once again expose the contacts 74 and other contacts such as the contact 82 that were obtained during a first deposit-litho-etching of a metal layer at the beginning of the process (FIG. 11J).

Figure 11K:
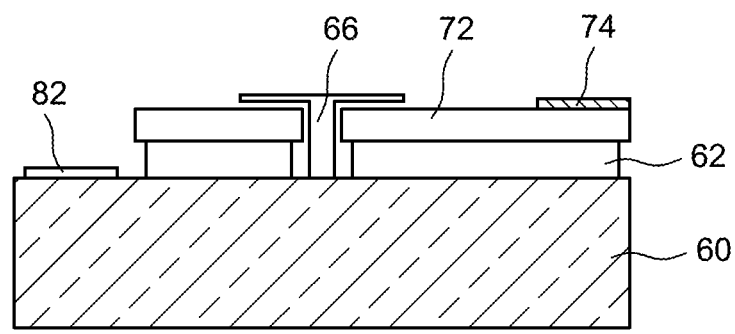

The silica layers are then partly eliminated by etching using hydrofluoric acid HF, to expose the beam with the tray (FIG. 11K).

We will now describe another example of a standalone type method in order to manufacture a unit device according to the invention with reference to FIGS. 12A to 12G.

Figure 12A:
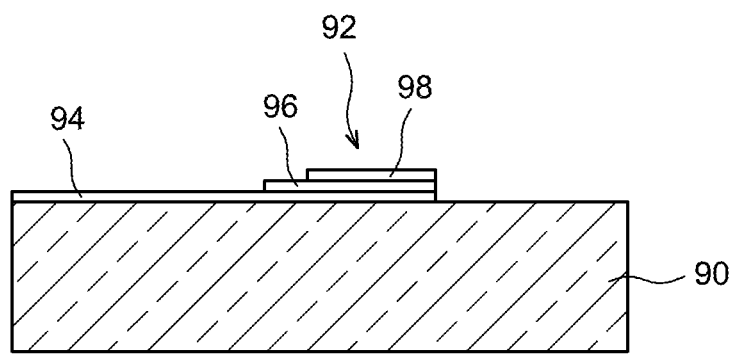

A silicon substrate 90 is used and an asymmetric piezoelectric stack 92 is formed on the substrate 90. This is done for example by depositing a layer of molybdenum 94 thereon and lithography is performed on this layer, a layer 96 for example made of AlN is deposited on the layer 94 and lithography is performed on this layer, a layer made for example from molybdenum 98 is deposited on the layer 96 and lithography is performed on this layer 98 (FIG. 12A).

Figure 12B:
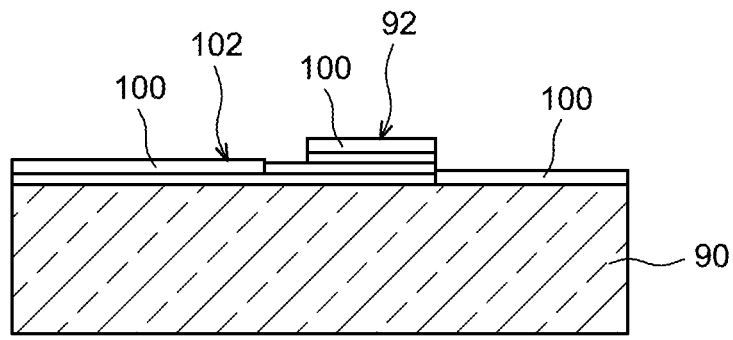

A layer 100 for example made of $SiO_2$ and 750 nm thick is then deposited on the structure obtained. Lithography is performed to expose the pattern 102 of the NEMS contained in the device (FIG. 12B).

Figure 12C:
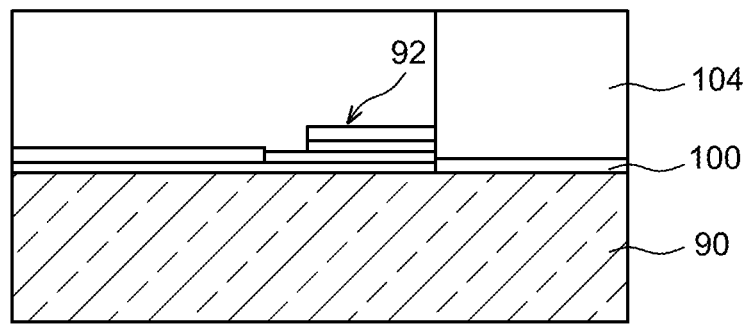

A layer 104 for example made of silicon oxide is deposited on the structure obtained (FIG. 12C).

Figure 12D:
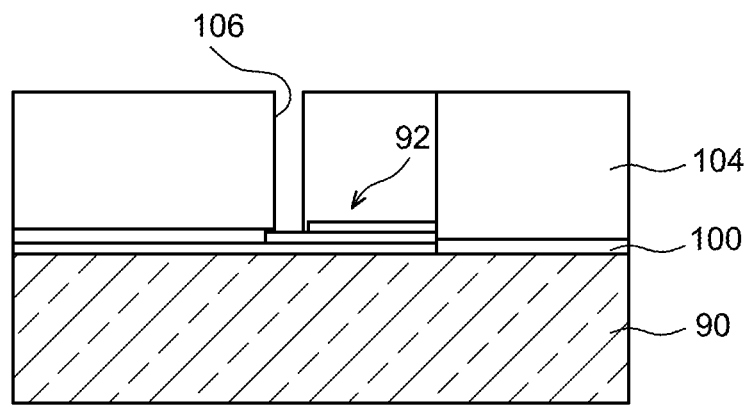

The layer 104 is then etched at the previously formed pattern 102 to define the location 106 of the beam of the device (FIG. 12D).

Figure 12E:
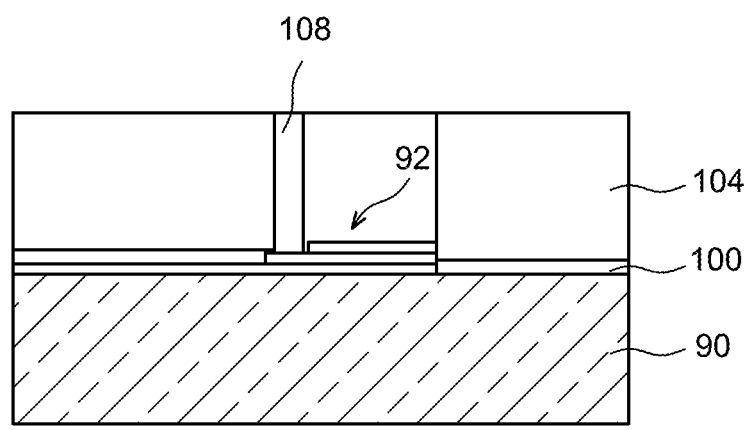

Polysilicon 108 for example is then deposited at this location up to the surface of the layer 104 to form this beam (FIG. 12E).

Figure 12F:
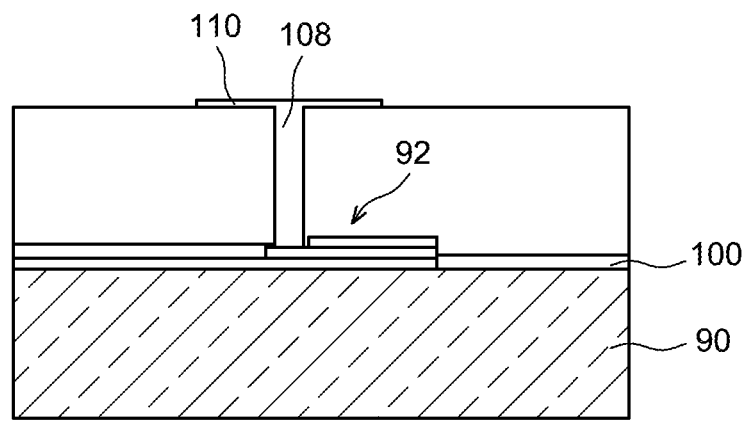

Polysilicon is deposited by LPCVD, for example over a thickness of 20 nm, and lithography is performed on this polysilicon to form the tray 110 of the device (FIG. 12F).

Figure 12G:
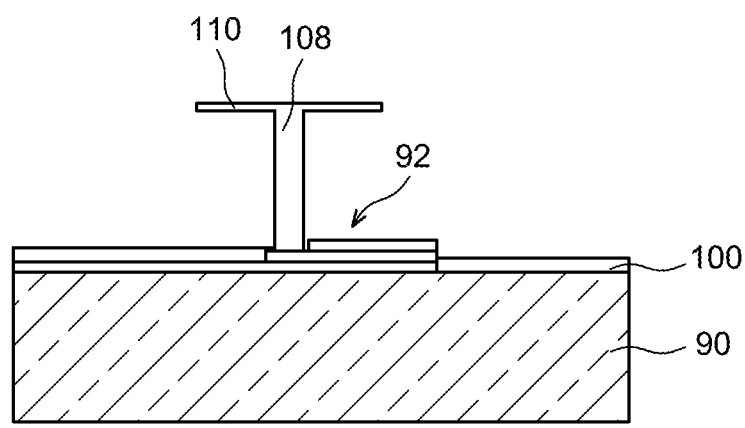

Wet etching of the resulting structure is applied to expose the beam with its tray, for example using hydrofluoric acid (FIG. 12G).

Devices conforming with the invention can also be made by a co-integrated or "above-IC" method as shown in FIG. 5. In this case, the main constraint results from the use of cold thermal processes, in other words processes used at temperatures below 500° C., or even below 300° C., to protect the integrity particularly of the CMOS circuit and its interconnections.

An SOI substrate can thus be used comprising an upper silicon layer, previously doped and activated, before cold molecular bonding above the CMOS. This can be done using the process described in the following document:

FR 2 961016, Circuit intégré à dispositif de type FET sans jonction et à depletion (Integrated circuit with junctionless depletion-mode FET type device), invention by T. Ernst et al.

In particular, this method uses a lower stop layer, for example made of $HfO_2$ or BN or SiN as shown in FIG. 5. Epitaxy should then be replaced by cold deposits, for example AlSi or W conducting deposits followed by mechanical chemical polishing (MCP) so that the conducting material only remains in the holes formed in the oxide ($SiO_2$). The polysilicon deposits can also be replaced by metal deposits or deposits of amorphous silicon possibly doped in-situ. Another possible way of obtaining polysilicon from a low temperature deposit of amorphous silicon is to use laser annealing of amorphous silicon to locally limit heating.

FIGS. 13A to 13J diagrammatically show steps in such a method (after transfer to CMOS) of fabricating a device conforming with the invention.

Figure 13A:
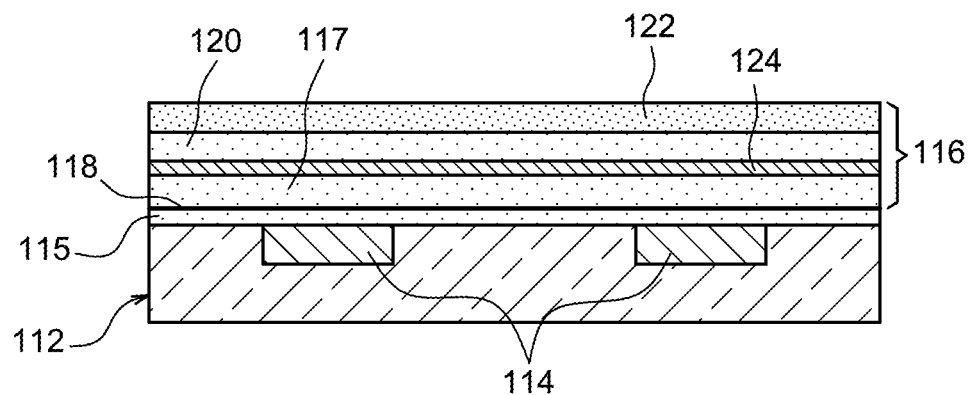
Figure 13B:
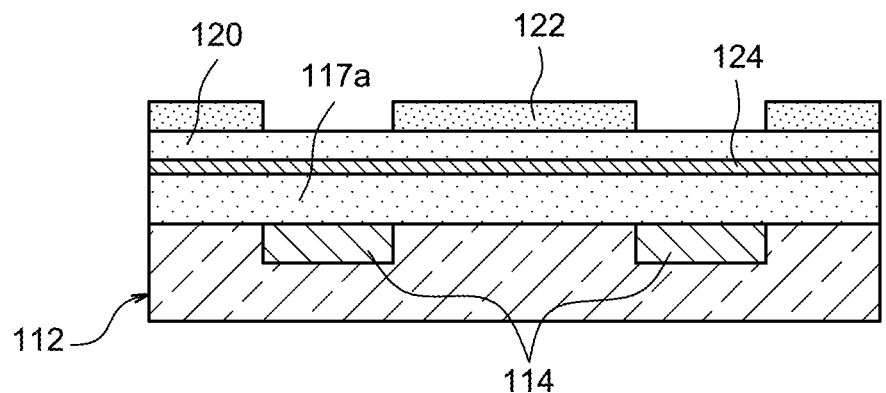
Figure 13C:
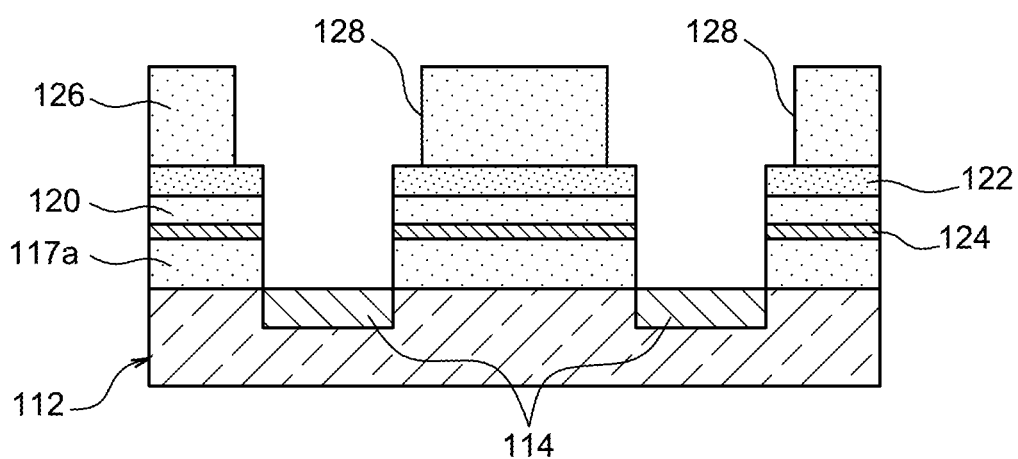
Figure 13D:
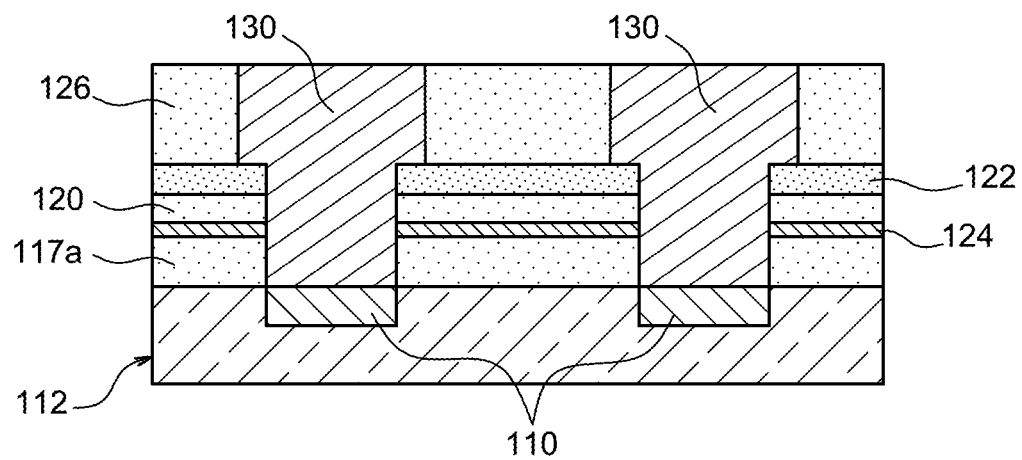
Figure 13E:
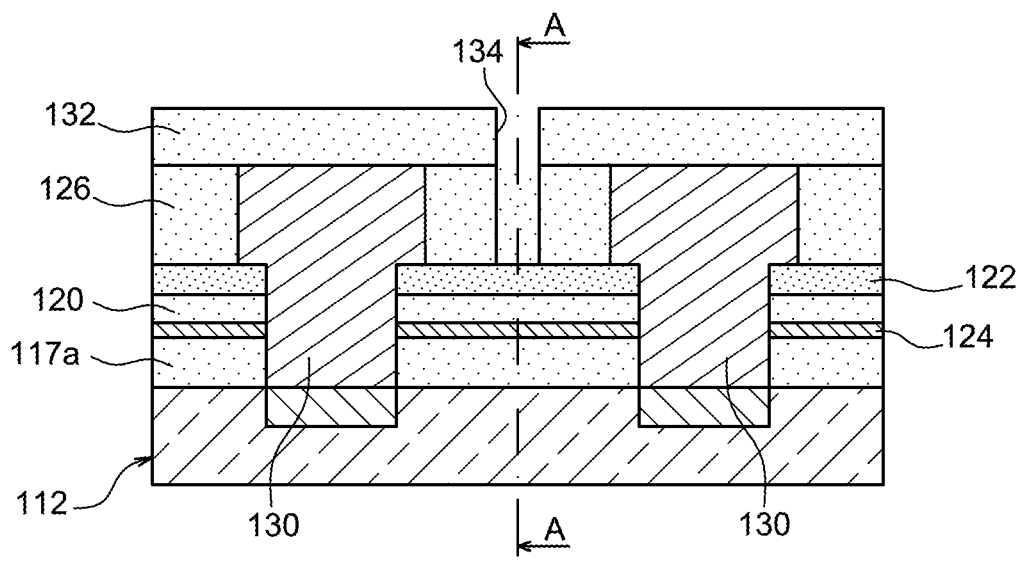
Figure 13F:
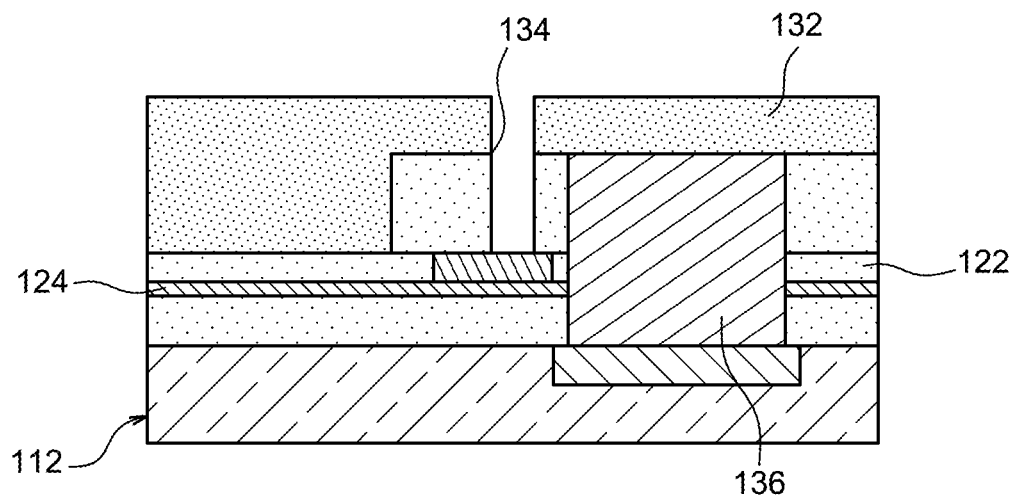
Figure 13G:
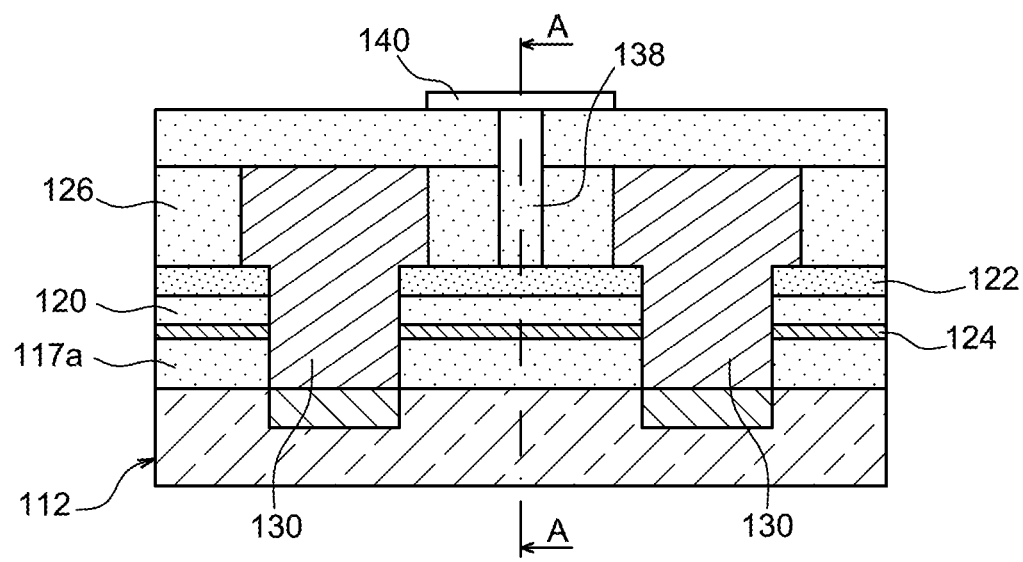
Figure 13H:
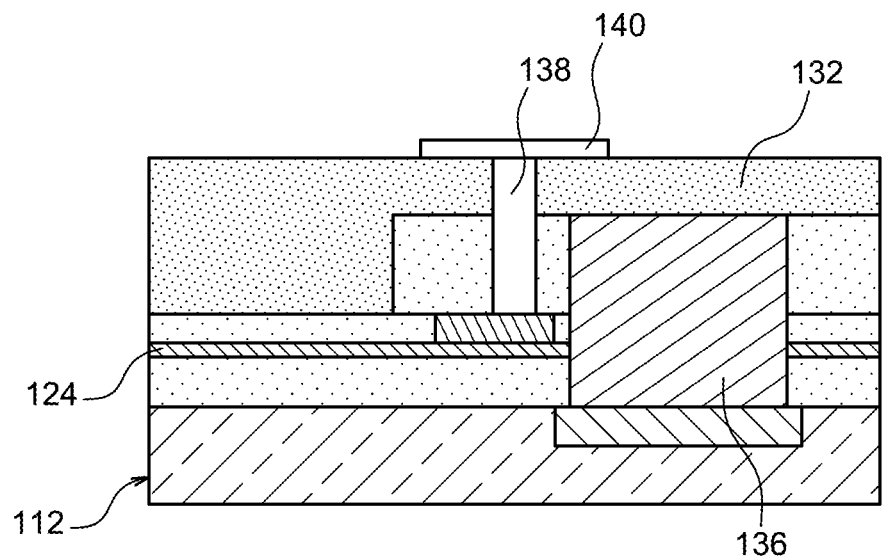
Figure 13I:
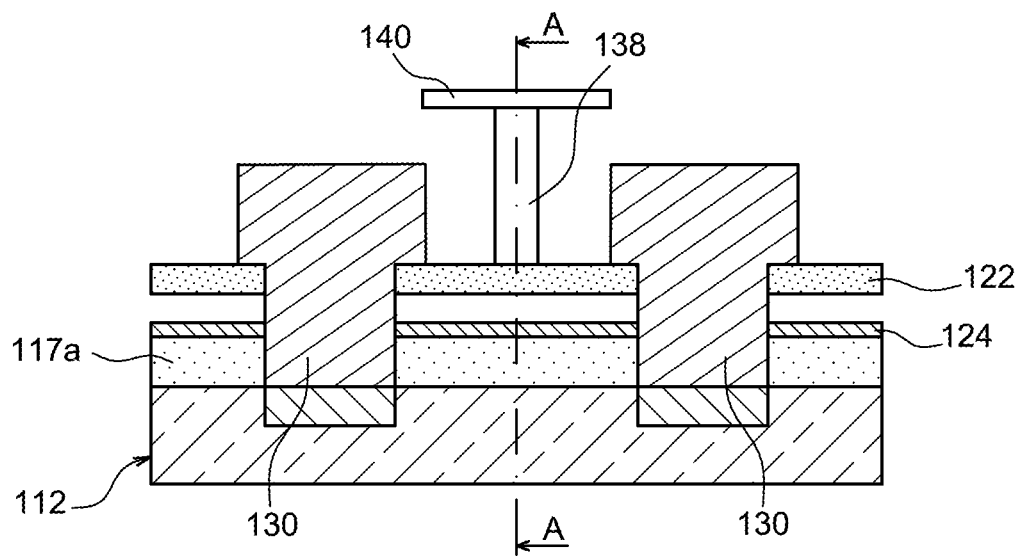
Figure 13J:
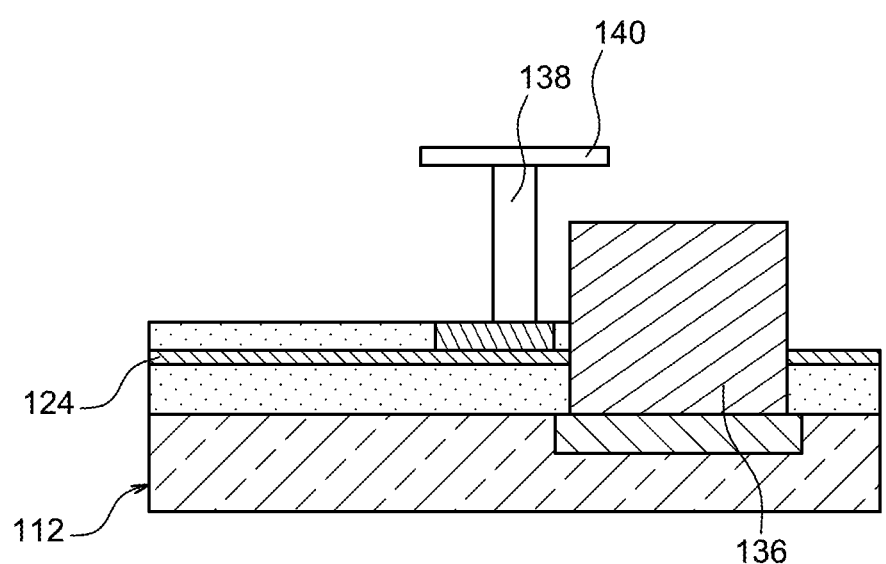

It should be noted that the successive steps in the method are diagrammatically illustrated by the sectional views in FIGS. 13A to 13E, 13G and 13I, while FIGS. 13F, 13H and 13J show sections AA in FIGS. 13E, 13G and 13I respectively.

FIG. 13A shows a CMOS wafer 112. Only its last "metal" layer is shown. Reference 114 denotes metal zones of this wafer 112 and reference 115 denotes a dielectric layer for example made of silica, for creating an oxide/oxide bond.

The structure 116 that was transferred onto the CMOS wafer by cold molecular bonding can also be seen. The reference of the bonding interface is 118. This structure 116 may be an SOI type substrate comprising an oxide bonding layer 117, for example 200 nm thick, a stop layer 124 for example 10 nm to 100 nm thick, a buried oxide 120 for example 400 nm thick, above which there is an upper layer 122 made of silicon for example 50 nm thick, previously doped with boron and activated. The oxide layer 117 enables molecular bonding with the layer 115. The combination of the layers 115 and 117 has reference numeral 117a in FIG. 13B and subsequent figures.

More generally, a layer of piezoelectric material may be used to replace this silicon layer.

The stop layer 124 between the buried oxide 120 and the bonding layer 117 can also be seen; for example it can be made of SiN, $HfO_2$ or BN.

For example, a 50 nm thick BN stop layer is used.

The structure 116 can also be obtained by successive deposits of appropriate layers.

Photolithography is then performed (FIG. 13B), followed by etching of the upper silicon layer 122 in the metal zones 114 and the parts thus etched are eliminated.

A silica insulating layer 126 for example 400 nm thick is then deposited on the upper layer 122 (FIG. 13C). A new photolithography is performed followed by etching through the layer 126 as far as the metal zones 114 at the etched zones of the layer 122 and the parts thus etched through the layer 126 are eliminated, hence the openings 128. This second photolithography can give a wider opening at the layer 126 than is possible with that obtained with the previous lithography (see the openings in the layer 122) and thus can reduce the contact resistance when contact is made subsequently between the deposit 130 and the layer 122 (see FIG. 13D and subsequent figures).

The next step (FIG. 13D) is ionic stripping of the structure thus obtained. A thick deposit, for example an AlSi deposit or a Ti/TiN+W multi-deposit, is then made in the openings 128, to obtain deposits or electrodes 130, followed by a mechanical chemical polishing of the AlSi or Ti/TiN+W thus deposited.

The next step is to deposit a silica layer 132 on the structure thus obtained (FIG. 13E). An opening 134 is then formed by photolithography and etching, approximately equidistant from the electrodes 130 in the example described, as far as the upper silicon layer 122. This opening 134 is intended for subsequent formation of a beam of the same type as the beam 8 shown in FIG. 5.

FIG. 13F shows the resulting structure observed along section AA in FIG. 13E, as defined above. This figure shows an electrode 136 made of AlSi or Ti/TiN+W that was formed at the same time as the electrodes 130 using the same fabrication steps. This electrode 136 will be used for actuation of the beam that will be formed in the opening 134.

FIG. 13G shows the step to form this beam 138 and its tray 140. FIG. 13H shows the beam-tray assembly along section AA in FIG. 13G. This assembly is obtained by an AlSi or HfO2 deposit or a deposit of any other equivalent material, for example such as BN followed by etching to define the tray 140.

Finally (FIG. 13I), the beam 138 with its tray 140 is exposed by etching the resulting structure using hydrofluoric acid in the liquid or vapour state. FIG. 13J shows this exposure occurring along section AA in FIG. 13I.

Let us return to the device, object of the invention, more precisely to the beam displacement detection means. Hereafter we precise the interest of having displacement detection means which are integrated, unlike displacement detection means which are known in the state of the art.

Let us explain the interest and difficulty for making a vertical NEMS with integrated detection means (as opposed to this state of the art where an optical detection, external to a chip, is used:

The integration of thin layers transduction means, which are conventionally electrical (driving and/or detection), is very often sought and is therefore a conventional problem per se; it makes it possible to strongly reduce the amount of spare used by the device, its cost and consumption, and in some cases improves the measurement precision. On the other hand, it may be very difficult to address a large number of resonators on the chip by an external means, as is the case for an array of resonators which is useful so as to cover a large capture area. In that case an integrated transduction is a solution to this problem.

In the case of a vertical device, made of thin layers, integrating the electrical detection means to the manufacturing method is much less obvious, particularly at small nanometric dimensions. This is because the device is obtained via successive layers in that case, and the etching thereof together with the correct manufacturing of the mechanical structure require finding means for avoiding too important disaligning between levels, typically of the same order of magnitude as the lateral dimensions of the device. Since the detection means measure a displacement or a stress their good operation depends on a well controlled positioning between the mechanical structure and these mans. In addition, when one wishes to get an "active" area (for detecting the particles) above and covering the detection means, the latter must be much less cumbersome than the resonator itself, which strongly limits possibilities.

The invention claimed is:

1. A micro-electromechanical or nano-electromechanical detection device comprising:
   a support including a face defining a plane,
   at least one beam with first and second ends, the second end being moveable relative to the support, and
   means of detecting beam displacement, adapted to output a signal that depends on the displacement,
   wherein each beam is anchored to the support through its first end and is approximately perpendicular to said plane, and the second end of each beam is provided with a tray comprising a plane face that is approximately perpendicular to the beam and forms a reception zone, that can receive one or several particles that can provoke or modify displacement of the beam in order to determine at least one physical property of the particle(s) from the signal output by the displacement detection means,
   wherein the detection means are located between the reception zone and the support.

2. Device according to claim 1, in which a section of the reception zone in a first plane that is parallel to said plane, is larger than a section of the beam in a second plane that is also parallel to said plane.

3. Device according to claim 1, comprising a set of beams organized into an array.

4. Device according to claim 1, in which the beam forms a resonator for which the resonant frequency varies when the reception zone receives the particle(s), and the device also comprises means of actuating the beam.

5. Device according to claim 4, in which the actuation means are chosen from among electrostatic actuation means, piezoelectric actuation means, thermoelastic actuation means and optical actuation means.

6. Device according to claim 1, in which detection means are chosen from among piezoresistive strain gauge detection means, capacitive detection means, piezoelectric detection means and optical detection means.

7. Device according to claim 6, in which piezoresistive strain gauges are chosen from among silicon gauges, metal gauges, graphene gauges and carbon nanotube-based gauges.

8. Device according to claim 1, further comprising a signal processor for processing the signal output by the displacement detection means, the signal processor being designed to determine said physical property.

9. Device according to claim 1, wherein the reception zone of each beam is covered with a layer that has a chemical affinity towards a gas to be detected.

10. A micro-electromechanical or nano-electromechanical detection device comprising:
    a support including a face defining a plane,
    at least one beam with first and second ends, the second end being moveable relative to the support, and
    means of detecting beam displacement, adapted to output a signal that depends on the displacement,
    wherein each beam is anchored to the support through its first end and is approximately perpendicular to said plane, the second end of each beam comprising at least one reception zone, that can receive one or several particles that can provoke or modify displacement of the beam in order to determine at least one physical property of the particle(s) from the signal output by the displacement detection means, and each beam being manufactured in a standalone form by a surface technology,
    wherein the detection means are located between the reception zone and the support and formed by a thin film deposition technique in at least one layer which is parallel to said plane.

11. Device according to claim 10, in which a section of the reception zone in a first plane that is parallel to said plane, is larger than a section of the beam in a second plane that is also parallel to said plane.

12. Device according to claim 10, comprising a set of beams organized into an array.

13. Device according to claim 10, in which the beam forms a resonator for which the resonant frequency varies when the reception zone receives the particle(s), and the device also comprises means of actuating the beam.

14. Device according to claim 13, in which the actuation means are chosen from among electrostatic actuation means, piezoelectric actuation means, thermoelastic actuation means and optical actuation means.

15. Device according to claim 10, in which detection means are chosen from among piezoresistive strain gauge detection means, capacitive detection means, piezoelectric detection means and optical detection means.

16. Device according to claim 15, in which piezoresistive strain gauges are chosen from among silicon gauges, metal gauges, graphene gauges and carbon nanotube-based gauges.

17. Device according to claim 10, further comprising a signal processor for detecting displacement of the beam, the signal processor being designed to determine said physical property.

18. Device according to claim 10, wherein the reception zone of each beam is covered with a layer that has a chemical affinity towards a gas to be detected.

19. Device according to claim 10, further comprising a signal processor for processing the signal output by the displacement detection means, the signal processor being designed to determine said physical property.

20. A micro-electromechanical or nano-electromechanical detection device comprising:
    a support including a face defining a plane,
    at least one beam with first and second ends, the second end being moveable relative to the support, and
    means of detecting beam displacement, adapted to output a signal that depends on the displacement,
    wherein each beam is anchored to the support through its first end and is approximately perpendicular to said plane, and the second end of each beam is provided with a tray comprising a plane face that is approximately perpendicular to the beam and forms a reception zone, that can receive one or several particles that can provoke or modify displacement of the beam in order to determine at least one physical property of the particle(s) from the signal output by the displacement detection means,
    wherein the detection means are located between the reception zone and the support, and
    wherein the tray does not comprise an opening.

* * * * *